(12) United States Patent  
Matsuda et al.

(10) Patent No.: US 8,064,320 B2
(45) Date of Patent: Nov. 22, 2011

(54) OPTICAL PICKUP AND OPTICAL DISC APPARATUS USING THE SAME

(75) Inventors: Mikinori Matsuda, Kanagawa (JP); Tsuguhiro Abe, Chiba (JP)

(73) Assignee: Sony Corporation, Tokyo (JP)

( * ) Notice: Subject to any disclaimer, the term of this patent is extended or adjusted under 35 U.S.C. 154(b) by 436 days.

(21) Appl. No.: 12/132,859

(22) Filed: Jun. 4, 2008

(65) Prior Publication Data

US 2009/0022040 A1   Jan. 22, 2009

(30) Foreign Application Priority Data

Jul. 19, 2007  (JP) .................... 2007-188646

(51) Int. Cl.
*G11B 7/135* (2006.01)
(52) U.S. Cl. ............................................ 369/112.29
(58) Field of Classification Search .................. None
See application file for complete search history.

(56) References Cited

U.S. PATENT DOCUMENTS

| 2005/0007906 A1* | 1/2005 | Horinouchi et al. ....... 369/44.37 |
| 2006/0002275 A1* | 1/2006 | Huang et al. ............. 369/112.01 |

FOREIGN PATENT DOCUMENTS

| JP | 62-29639 | 2/1987 |
| JP | 63-29234 | 2/1988 |
| JP | 9-44874 | 2/1997 |
| JP | 10-302304 | 11/1998 |
| JP | 2006-4547 | 1/2006 |
| JP | 2007-179635 | 7/2007 |
| JP | 2007-334990 | 12/2007 |
| WO | WO 2006/112153 A1 | 10/2006 |

OTHER PUBLICATIONS

Office Action issued on Jul. 26, 2011, in Japanese Patent Application No. 2007-188646, filed Jul. 19, 2007 (with English-language Translation).

* cited by examiner

*Primary Examiner* — Wayne Young
*Assistant Examiner* — Brian Butcher
(74) *Attorney, Agent, or Firm* — Oblon, Spivak, McClelland, Maier & Neustadt, L.L.P.

(57) ABSTRACT

An optical pickup includes first and second objective lenses; a first raising optical element that reflects an optical beam from a first direction within a plane substantially orthogonal to an optical axis of the first objective lens, thereby the optical beam being incident on the first objective lens; and a second raising optical element that reflects an optical beam from a second direction at an angle to the first direction within a plane substantially orthogonal to the optical axis of the second objective lens, thereby the optical beam being incident on the second objective lens. At least one lateral surface of at least one of the first and second raising optical elements is at an angle of 90 degrees or smaller to a reflection surface thereof. The lateral surface of the one raising optical element is arranged to face a lateral surface of the other raising optical element.

8 Claims, 7 Drawing Sheets

OPTICAL PICKUP AND OPTICAL DISC APPARATUS USING THE SAME

CROSS REFERENCES TO RELATED APPLICATIONS

The present invention contains subject matter related to Japanese Patent Application JP 2007-188646 filed in the Japanese Patent Office on Jul. 19, 2007, the entire contents of which are incorporated herein by reference.

BACKGROUND OF THE INVENTION

1. Field of the Invention

The present invention relates to an optical pickup that records and/or reproduces information signals on and/or from an optical disc, and an optical disc apparatus using the optical pickup.

2. Description of the Related Art

Hitherto, an optical disc, such as a compact disc (CD) or a digital versatile disc (DVD); or to achieve further high-density recording, an optical disc for recording/reproducing signals using an optical beam with a wavelength of about 405 nm emitted from, for example, a blue-violet semiconductor laser, this type of optical disc being hereinafter referred to as "high-density recording optical disc", has been used as a recording medium for information signals. An optical disc apparatus has been used for recording information signals on such an optical disc, or reproducing information signals recorded on such an optical disc.

Such an optical pickup is being desired to be compatible with a plurality of types of optical discs. Hence, to be compatible with optical discs in different formats with different usable wavelengths and different thicknesses of protection substrates, an optical pickup is being provided, which uses a plurality of optical beams with different wavelengths and has a plurality of objective lenses (for example, see Japanese Unexamined Patent Application Publication No. 2006-4547).

The optical pickup having the plurality of objective lenses includes an objective lens drive unit having a fixed portion and a movable portion. For example, two objective lenses are aligned in a tangential direction or a radial direction on a lens holder functioning as the movable portion of the objective lens drive unit. The optical pickup selects one of the objective lenses depending on the format and type of an optical disc.

The optical pickup also includes optical systems for respectively guiding optical beams with wavelengths corresponding to the objective lenses. In general, an optical beam guided in a plane orthogonal to an optical axis of an objective lens is reflected and raised with a raising mirror toward the objective lens, thereby collecting the optical beam onto the optical disc with the objective lens.

Meanwhile, such an optical pickup is demanded to reduce a distance between the objective lenses for reduction in size and weight of the movable portion as well as the entire optical pickup. To reduce the distance between the objective lenses, it is necessary to reduce a distance between the raising mirrors corresponding to the objective lenses. For example, if two objective lenses and two raising mirrors are provided and optical paths to the raising mirrors do not define an angle to each other within a plane, that is, if optical beams are incident on the raising mirrors in the same direction, or opposite directions, the sizes of the raising mirrors are reduced to a limit of an effective area corresponding to apertures of the objective lenses. In addition, the raising mirrors are adjacently arranged, thereby reducing the distance between the raising mirrors, and the distance between the objective lenses.

However, in view of the optical systems, and reduction in size of the entire optical pickup, an optical path of an optical beam being incident on one of the raising mirrors may define an angle to an optical path of an optical beam incident on the other of the raising mirrors. In such a case, the distance between the raising mirrors may be increased by thicknesses of the raising mirrors. Owing to this, the distance between the objective lenses may be increased, and the size of the lens holder functioning as the movable portion may be increased.

SUMMARY OF THE INVENTION

It is desirable to provide an optical pickup including a plurality of objective lenses and a plurality of raising optical elements that cause optical beams to be incident on the objective lenses, and being capable of reducing a distance between the objective lenses and a distance between the raising optical elements, thereby reducing a size of a lens holder for holding the objective lenses; and to provide an optical disc apparatus using the optical pickup.

An optical pickup according to an embodiment of the present invention records and/or reproduces information by irradiating a plurality of types of optical discs selectively with a plurality of optical beams with different wavelengths. The optical pickup includes a laser source that emits the plurality of optical beams with the different wavelengths; first and second objective lenses having different specifications and arranged so that optical axes thereof are substantially parallel to each other; a first raising optical element that reflects an optical beam from a first direction within a plane substantially orthogonal to the optical axis of the first objective lens, to cause the reflected optical beam to be incident on the first objective lens; and a second raising optical element that reflects an optical beam from a second direction at an angle to the first direction within a plane substantially orthogonal to the optical axis of the second objective lens, to cause the reflected optical beam to be incident on the second objective lens. At least one lateral surface of at least one of the first and second raising optical elements is formed at an angle of 90 degrees or smaller to a reflection surface thereof. The lateral surface of the one of the first and second raising optical elements is arranged to face a lateral surface of the other of the first and second raising optical elements.

An optical disc apparatus according to another embodiment of the present invention includes a drive unit that holds and rotationally drives an optical disc desirably selected from a plurality of types of optical discs; and an optical pickup that records and/or reproduces information by irradiating the optical disc rotationally driven with the drive unit, with a corresponding optical beam selected from a plurality of optical beams with different wavelengths. The optical pickup includes a laser source that emits the plurality of optical beams with the different wavelengths; first and second objective lenses having different specifications and arranged so that optical axes thereof are substantially parallel to each other; a first raising optical element that reflects an optical beam from a first direction within a plane substantially orthogonal to the optical axis of the first objective lens, to cause the reflected optical beam to be incident on the first objective lens; and a second raising optical element that reflects an optical beam from a second direction at an angle to the first direction within a plane substantially orthogonal to the optical axis of the second objective lens, to cause the reflected optical beam to be incident on the second objective lens. At least one lateral surface of at least one of the first and second raising optical elements is formed at an angle of 90 degrees or smaller to a reflection surface thereof. The lateral surface of the one of the first and second raising optical elements is arranged to face a lateral surface of the other of the first and second raising optical elements.

Accordingly, the reflection surfaces of the first and second raising optical elements can be closely arranged, thereby reducing a distance between the first and second objective lenses, and reducing the size of the lens holder for holding the first and second objective lenses.

BRIEF DESCRIPTION OF THE DRAWINGS

FIGS. 7A to 7E illustrate the second raising mirror of the optical pickup according to the embodiment of the present invention, in which FIGS. 8A to 8C illustrate the first raising mirror of the optical pickup according to the embodiment of the present invention, in which FIG. 7C is a front view.

DESCRIPTION OF THE PREFERRED EMBODIMENTS

Figure 1:
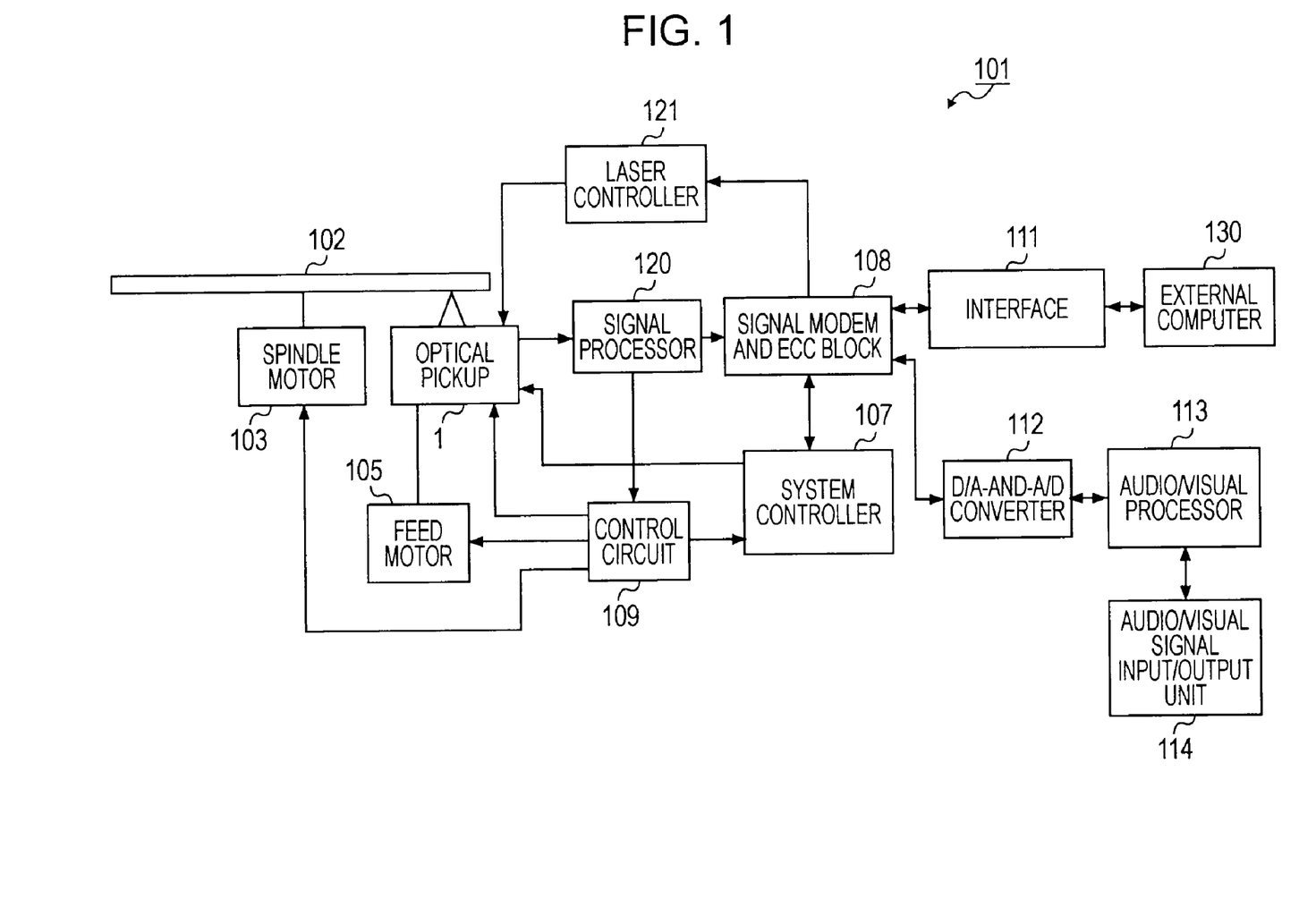
FIG. 1 is a circuit block diagram briefly showing a configuration of an optical disc apparatus according to an embodiment of the present invention.

An optical disc apparatus using an optical pickup according to an embodiment of the present invention is described below with reference to the attached drawings. As shown in FIG. 1, an optical disc apparatus 101 is a recording/reproducing apparatus that records and/or reproduces information signals on and/or from an optical disc 102.

For example, the optical disc 102 for recording and/or reproduction with the optical disc apparatus 101 may be a compact disc (CD) or a digital versatile disc (DVD); a CD recordable (CD-R) or a DVD recordable (DVD-R) available for recording of information; a CD rewritable (CD-RW) or a DVD rewritable (DVD-RW or DVD+RW) available for rewriting of information; an optical disc for high-density recording using a blue-violet semiconductor laser with a short emission wavelength of about 405 nm; or a magneto-optical disk.

As shown in FIG. 1, the optical disc apparatus 101 includes a spindle motor 103 functioning as a drive unit that rotationally drives the optical disc 102, an optical pickup 1, and a feed motor 105 functioning as a drive unit for moving the optical pickup 1 in a radial direction of the optical disc 102. The spindle motor 103 drive at a predetermined rotation rate under the control of a system controller 107 and a control circuit 109.

A signal modem and ECC block 108 modulates or demodulates signals output from a signal processor 120, and adds an error correction code (ECC) to the signals. The optical pickup 1 irradiates a signal recording surface of the optical disc 102 with an optical beam while the optical disc 102 is rotated upon instructions from the system controller 107 and the control circuit 109. Information signals are recorded on the optical disc 102, or information signals recorded on the optical disc 102 are reproduced, by irradiation of an optical beam.

The optical pickup 1 detects various types of optical beams, which will be described later, on the basis of optical beams reflected from the signal-recording surface of the optical disc 102, and supplies the signal processor 120 with detection signals obtained from the optical beams.

The signal processor 120 generates various servo control signals, that is, a focus error signal and a tracking error signal, on the basis of the detection signals obtained by detecting the optical beams, and generates RF signals which are information signals recorded in an optical disc 102. Further, depending on the type of a recording medium from which information is reproduced, the control circuit 109, the signal modem and ECC block 108, and other components, perform predetermined processing such as demodulation and error correction, on the basis of the above signals.

For example, when the recorded signals demodulated with the signal modem and ECC block 108 are intended for data storage on a computer, the demodulated signals are output to an external computer 130 or the like via an interface 111. Thus, the external computer 130 or the like can receive the signal recorded on the optical disc 102 as reproduction signals.

When the recorded signals demodulated with the signal modem and ECC block 108 are intended for an audio/visual application, the demodulated signals are converted from digital to analog by a D/A converter in a D/A-and-A/D converter 112, and the converted signals are fed to an audio/visual processor 113. The audio/visual processor 113 performs audio/video signal processing, and the processed signal is transmitted to an external imaging or projecting device via an audio/visual signal input/output unit 114.

The optical pickup 1 is connected to the feed motor 105. The optical pickup 1 is fed in a radial direction of the optical disc 102 with rotation of the feed motor 105, and is moved to a predetermined recording track of the optical disc 102. The control circuit 109 controls the spindle motor 103, the feed motor 105, and the objective lens drive mechanism for moving the objective lens of the optical pickup 1 in a focusing direction along an the optical-axis direction thereof, and in a tracking direction orthogonal to the optical axis.

That is, the control circuit 109 controls the spindle motor 103, and the objective lens drive mechanism on the basis of the focus error signal and the tracking error signal.

Also, the control circuit 109 generates driving signals (driving current) to be supplied to a tracking coil and a focusing coil provided at the optical pickup 1, on the basis of the focus error signal, the tracking error signal, the RF signals, and the like, input from the signal processor 120.

A laser controller 121 controls a laser source in the optical pickup 1.

Here, a focusing direction F is an optical-axis direction of the objective lenses 23 and 24 of the optical pickup 1, a tangential direction Tz is a direction orthogonal to the focusing direction F and parallel to a tangential direction Tz of the circumference of the optical disc apparatus 101, and a tracking direction T is a direction orthogonal to the focusing direction F and the tangential direction Tz.

Next, the detail of the optical pickup 1 is described according to an embodiment of the present invention.

The optical pickup 1 is used for an optical disc apparatus that records and/or reproduces information signals on and/or from a plurality of types of optical discs 102, to which recording and/or reproduction of information signals is performed by selectively using a plurality of types of optical beams with different wavelengths. In particular, it is assumed that recording and/or reproduction of information signals is performed for first to third optical discs. The first optical disc is available for recording or reproduction of information signals using an optical beam with a first wavelength ranging from about 400 to 410 nm. The second optical disc is available for recording or reproduction of information signals using an optical beam with a second wavelength ranging from about 650 to 660 nm. The third optical disc is available for recording or reproduction of information signals using an optical beam with a third wavelength ranging from about 760 to 800 nm.

In the following description, the optical pickup 1 is assumed to record and/or reproduce information signals on and/or from three types of optical discs, however, it is not limited thereto. The optical pickup 1 may record and/or reproduce information signals on and/or from one type or a plurality of types of optical discs.

The optical pickup 1 according to the embodiment includes first and second laser sources 21 and 22, photodiodes, and optical systems. The laser sources 21 and 22 may be the above-mentioned semiconductor lasers that emit a plurality of types of optical beams with different wavelengths. The photodiodes function as photodetector elements that detect optical beams reflected from the signal recording surface of the optical disc 102. The optical systems guide the optical beams from the first and second laser sources 21 and 22 to the optical disc 102 and guide the optical beams reflected from the optical disc 102 to the photodetector elements.

The first laser source 21 includes an emitting unit that emits an optical beam with a first wavelength. The second laser source 22 includes an emitting unit that emits an optical beam with a second wavelength and an emitting unit that emits an optical beam with a third wavelength.

Figure 2:
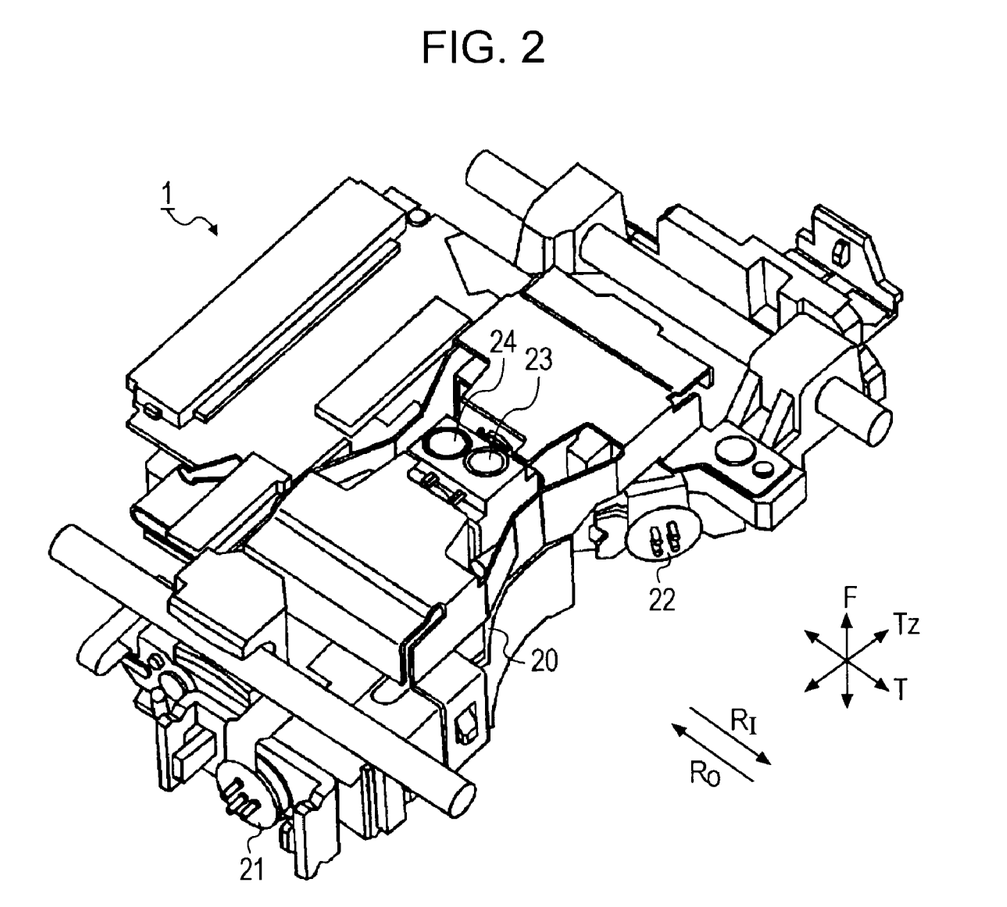
FIG. 2 is a perspective view showing an optical pickup according to an embodiment of the present invention.
Figure 3:
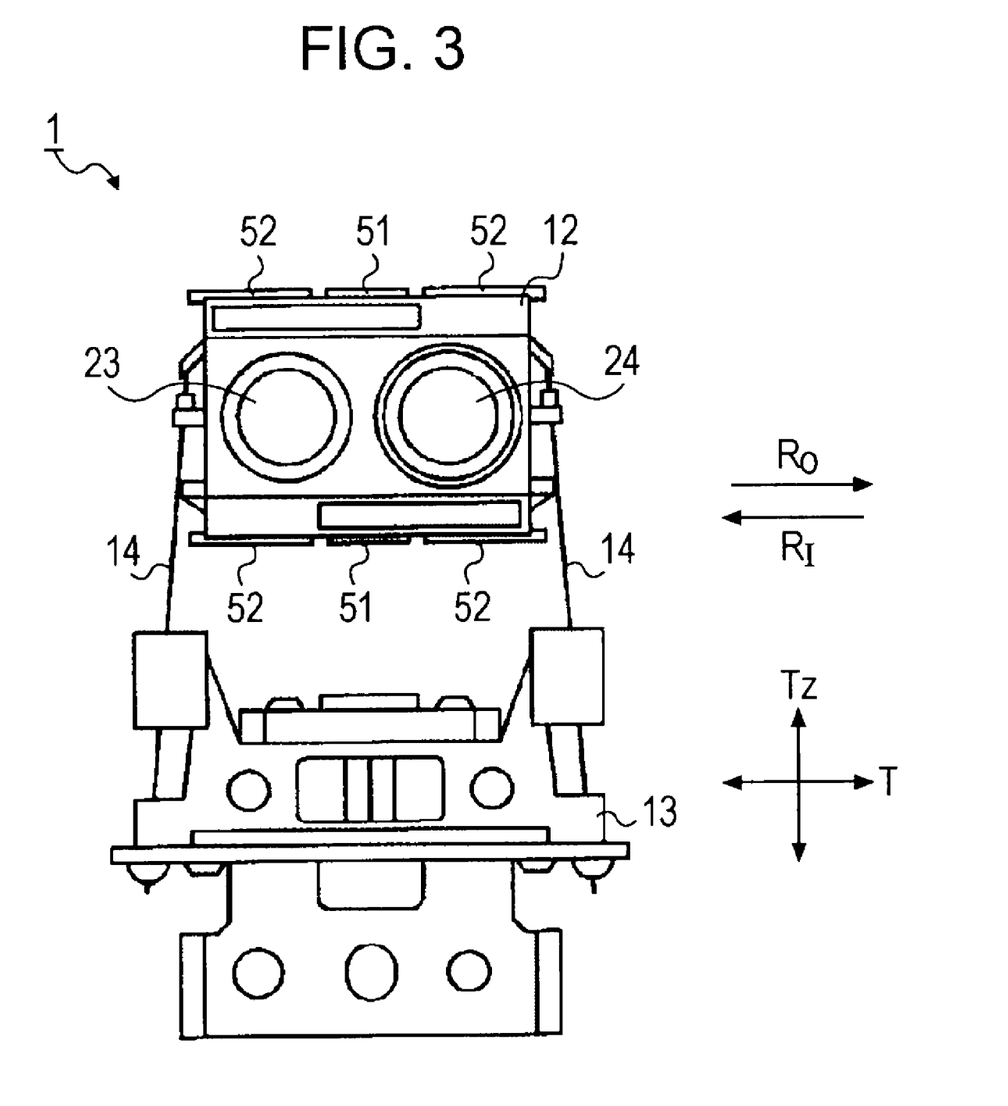
FIG. 3 is a plan view showing a lens holder for holding objective lenses of the optical pickup, and a supporting member for supporting the lens holder, according to the embodiment of the present invention.
Figure 6:
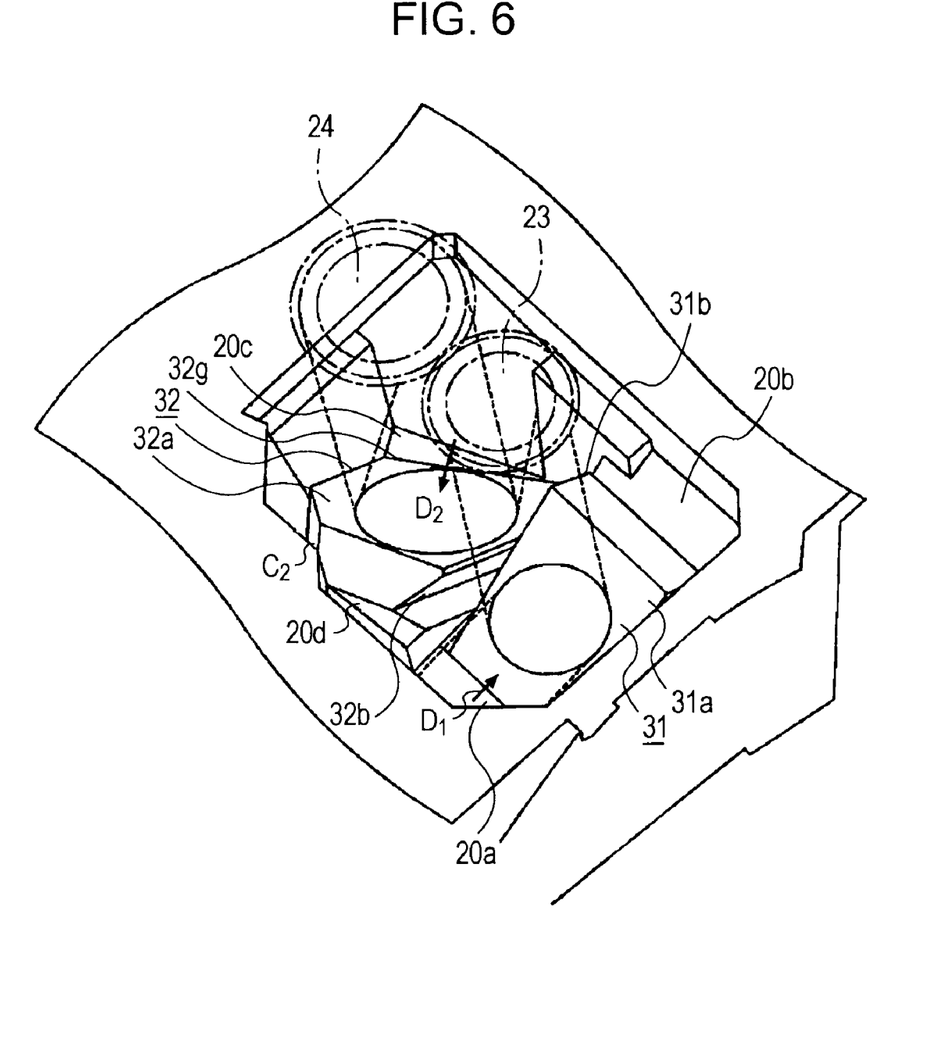
FIG. 6 is a perspective view showing the arrangement of the first and second raising mirrors of the optical pickup according to the embodiment of the present invention.

Referring to FIG. 2, the optical pickup 1 is mounted on a mounting base 20 for various components provided movably in a radial direction R of the optical disc 102 within a casing of the optical disc apparatus 101. In FIGS. 2, 3, and 6, arrow $R_I$ indicates a direction toward the inner circumference in the radial direction, whereas arrow $R_O$ indicates a direction toward the outer circumference in the radial direction.

Referring to FIG. 3, the optical pickup 1 includes a lens holder 12, a supporting member 13, and a plurality of supporting arms 14. The lens holder 12 supports the plurality of objective lenses 23 and 24 for collecting the optical beams emitted from the laser sources and irradiates the optical disc with the optical beams. The supporting member 13 is mounted on the mounting base 20 at a distance from the lens holder 12 in the tangential direction Tz. The supporting arms 14 support the lens holder 12 with respect to the supporting member 13 movably in the focusing direction F and the tracking direction T. The lens holder 12, the supporting member 13 and the supporting arms 14, together with coils 51 and 52 and a magnet, which will be described later, function as the objective lens drive mechanism that drives the objective lenses 23 and 24 in the focusing direction F and the tracking direction T. Also, the first and second objective lenses 23 and 24 serve as a part of the optical systems of the optical pickup 1. For example, the first objective lens 23 is made of glass, and the second objective lens 24 is made of synthetic resin, however, it is not limited thereto. Both the first and second objective lenses 23 and 24 may be made of glass or synthetic resin.

The first and second objective lenses 23 and 24 are arranged such that the optical axes thereof are substantially parallel to each other.

While the optical pickup 1 includes the plurality of objective lenses 23 and 24 aligned in the radial direction R (tracking direction T), the number of objective lenses and their arrangement are not limited thereto. For example, a plurality of objective lenses may be aligned in the tangential direction Tz.

Figure 4:
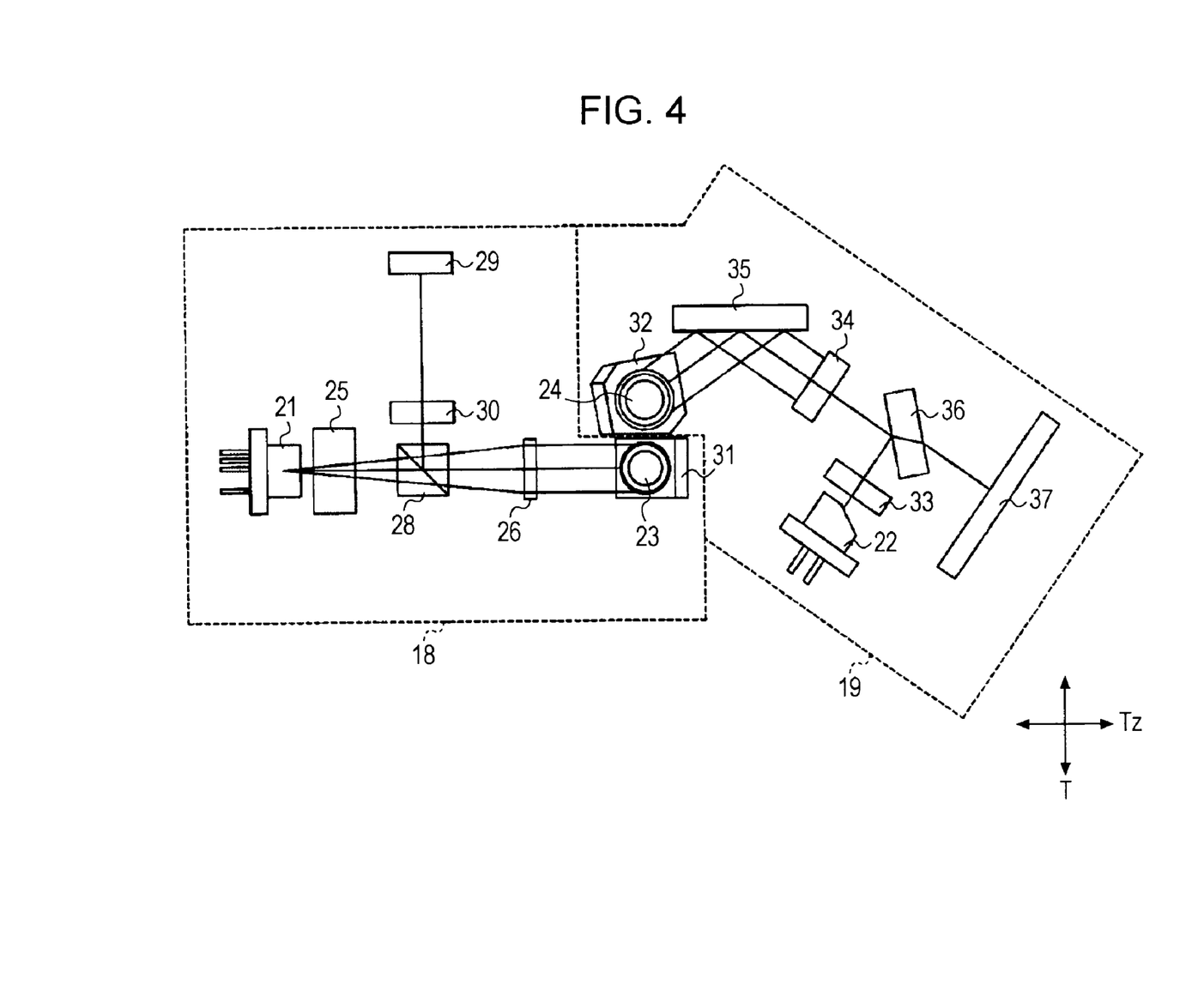
FIG. 4 is a plan view showing optical systems of the optical pickup according to the embodiment of the present invention.

Referring to FIG. 4, the optical systems that guide the optical beams emitted from the first and second laser sources 21 and 22 to the optical disc 102 include a first optical system 18 and a second optical system 19. The first optical system 18 guides the optical beam emitted from the first laser source 21 to the first objective lens 23, and then to the optical disc 102, which is the first optical disc. The second optical system 19 guides the optical beam emitted from the second laser source 22 to the second objective lens 24, and then to the optical disc 102, which is the second or third optical disc.

The first optical system 18 at least includes a first grating 25, a first collimator lens 26, a first raising mirror 31, and the above-mentioned first objective lens 23. The first grating 25 diffracts the optical beam with the first wavelength emitted from the first laser source 21 to split the laser beam into at least three beams. The first collimator lens 26 converts an angle of divergence of the optical beams diffracted with the first grating 25 to collimate the optical beams into substantially parallel beams. The first raising mirror 31 reflects the substantially parallel optical beams collimated with the first collimator lens 26 to guide the optical beams toward the first objective lens 23 and the optical disc 102. The first objective lens 23 collects the optical beams reflected from the first raising mirror 31 onto the signal recording surface of the optical disc 102. The first optical system 18 also includes a polarizing beam splitter 28, a first photodetector 29, and a multilens 30, between the first grating 25 and the first collimator lens 26. The polarizing beam splitter 28 separates an optical path of returning optical beams that are collected with the first objective lens 23 and reflected from the optical disc 102, from an optical path of outgoing optical beams emitted from the first laser source 21. The first photodetector 29 receives and detects the returning optical beams separated with the polarizing beam splitter 28. The multilens 30 is disposed between the polarizing beam splitter 28 and the first photodetector 29, and collects the returning optical beams separated with the polarizing beam splitter 28 onto a photodetection surface of the first photodetector 29.

The second optical system 19 includes a second grating 33, a second collimator lens 34, a bending mirror 35, a second raising mirror 32, and the above-mentioned second objective lens 24. The second grating 33 diffracts the optical beam with the second or third wavelength emitted from the second laser source 22 to split the laser beam into at least three beams. The second collimator lens 34 converts an angle of divergence of the optical beams diffracted with the second grating 33 to collimate the optical beams into substantially parallel beams. The bending mirror 35 reflects the substantially parallel optical beams collimated with the second collimator lens 34 to change an optical path of the optical beams within a plane substantially orthogonal to the focusing direction F. The second raising mirror 32 reflects the optical beams reflected from the bending mirror 35 to guide the optical beams toward the second objective lens 24 and the optical disc 102. The second objective lens 24 collects the optical beams reflected from the second raising mirror 32 onto the signal recording surface of the optical disc 102. The second optical system 19 also includes a beam splitter 36 and a second photodetector 37, on the optical path between the second grating 33 and the second collimator lens 34. The beam splitter 36 separates an optical path of returning optical beams that are collected with the second objective lens 24 and reflected from the optical disc 102, from an optical path of outgoing optical beams emitted from the second laser source 22. The second photodetector 37 receives and detects the returning optical beams separated with the beam splitter 36.

Figure 5:
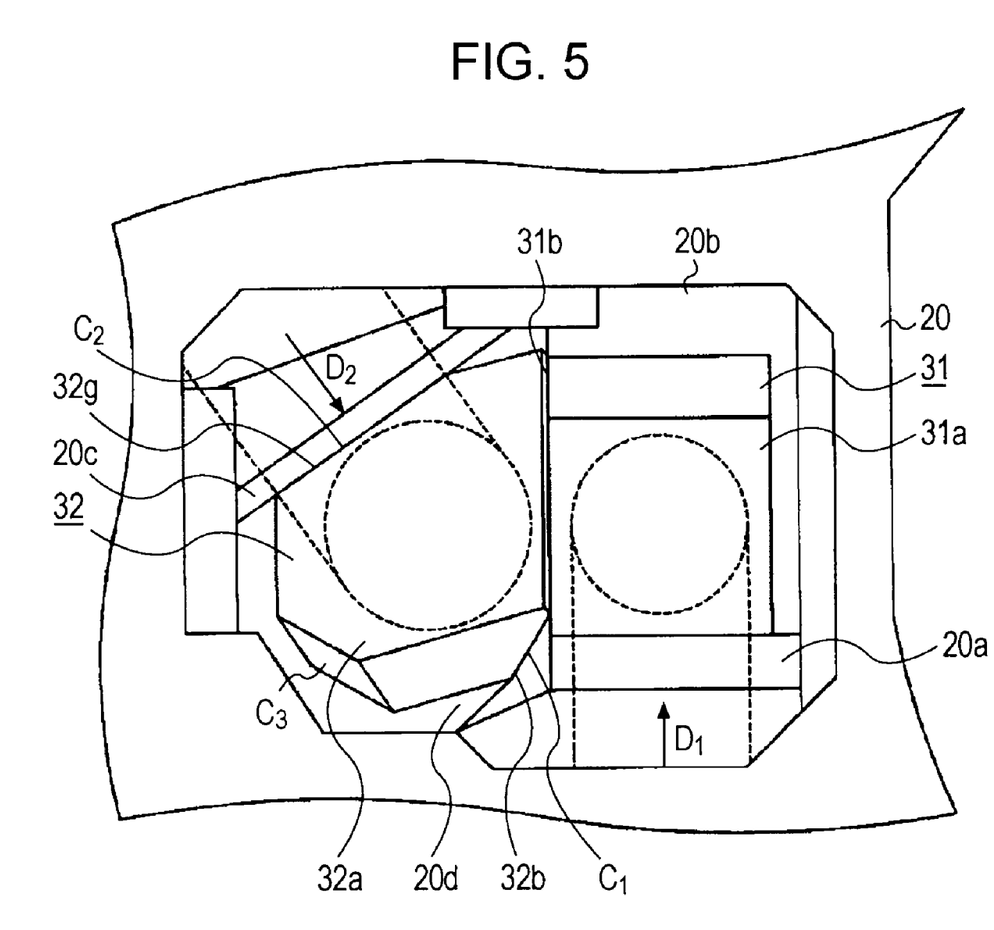
FIG. 5 is a plan view showing arrangement of first and second raising mirrors of the optical pickup according to the embodiment of the present invention.

Referring to FIGS. 4, 5, and 6, in the first optical system 18, the first raising mirror 31 functions as a first raising optical element that reflects an optical beam from a first direction $D_1$ within a plane substantially orthogonal to the optical axis of the first objective lens 23, to cause the optical beam to be incident on the first objective lens 23. In particular, the optical beam with the first wavelength emitted from the first laser source 21 of the first optical system 18 is incident on the first raising mirror 31 via the first grating 25, the polarizing beam splitter 28, and the first collimator lens 26. The optical beam is guided within the plane substantially orthogonal to the optical axis of the first objective lens 23 in the optical path. The first raising mirror 31 reflects the optical beam from the first direction $D_1$ within the plane from the first collimator lens 26, to cause the optical beam to be incident on the first objective lens 23. The optical beam being incident on the first objective lens 23 is collected onto the signal recording surface of the first optical disc.

In the second optical system 19, the second raising mirror 32 functions as a second raising optical element that reflects the optical beam from a second direction $D_2$ at an angle to the first direction $D_1$ within a plane substantially orthogonal to the optical axis of the second objective lens 24, to cause the optical beam to be incident on the second objective lens 24. In particular, the optical beam with the second or third wavelength emitted from the second laser source 22 of the second optical system 19 is incident on the second raising mirror 32 via the second grating 33, the beam splitter 36, the second collimator lens 34, and the bending mirror 35. The optical beam is guided within the plane substantially orthogonal to the optical axis of the second objective lens 24 in the optical path. The second raising mirror 32 reflects the optical beam from the second direction $D_2$ within the plane from the bending mirror 35, to cause the optical beam to be incident on the second objective lens 24. The optical beam incident on the second objective lens 24 is collected onto the signal recording surface of the second or third optical disc.

Herein, the reasons for provision of a predetermined angle defined between the first direction $D_1$ in which the optical beam is incident on the first raising mirror 31 and the second direction $D_2$ in which the optical beam is incident on the second raising mirror 32 are described below. There are considered various reasons for the provision of the predetermined angle defined between the first and second directions $D_1$ and $D_2$ within the plane orthogonal to the optical axes of the objective lenses 23 and 24. As distinctive reasons, a first reason is that, for reduction in size of the optical pickup 1, incidence of the optical beams in the same direction (or opposite directions) may restrict the arrangement of the optical components, and hence, the arrangement of the first and second directions $D_1$ and $D_2$ with the predetermined angle defined therebetween is advantageous to reduction in size of the optical pickup 1. A second reason is that, in the second optical system 19 of the optical pickup 1, the focus error signal is detected by obtaining astigmatism with the parallel plate beam splitter 36 for detecting a focus error signal without a multilens provided, and the tracking error signal is detected by differential phase detection (DPD) method. When a multilens is not provided in the second optical system 19 like this embodiment, the optical beams have to be obliquely incident on the beam splitter 36 within the plane. That is, arranging the first and second directions $D_1$ and $D_2$ at a predetermined angle defined therebetween can simplify the configuration when a multilens is not provided, and increase freedom of arrangement of the optical components. With the first and second reasons, the optical components are arranged in the optical pickup 1 such that the first direction $D_1$ is at about 35 degrees to the second direction $D_2$ within the plane substantially orthogonal to the optical axes of the objective lenses 23 and 24.

Figure 7A:
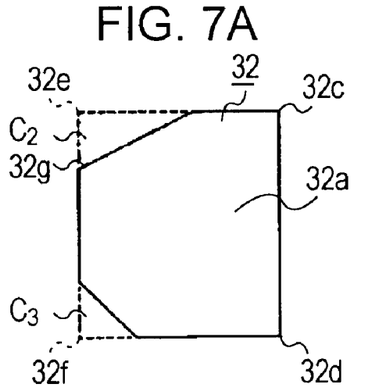
FIG. 7A is a plan view.
Figure 7B:
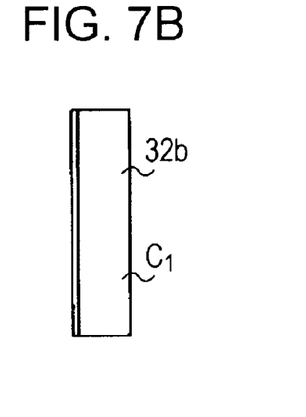
FIG. 7B is a right side view.
Figure 7C:
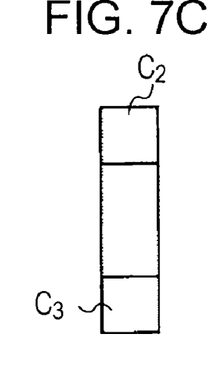
FIG. 7C is a left side view.

Also, at least one lateral surface of at least one of the first and second raising mirrors 31 and 32 is at an angle of 90 degrees or smaller to a reflection surface thereof. In particular, referring to FIGS. 7A, 7B, and 7D, the second raising mirror 32 has a lateral surface 32b facing the first raising mirror 31 so that the lateral surface 32b is at an angle $\theta_1$ of 90 degrees or smaller to a reflection surface 32a.

Figure 7D:
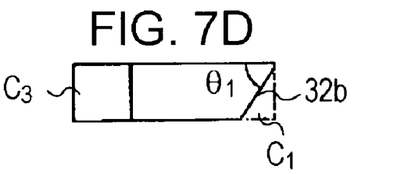
FIG. 7D is a front view.
Figure 7E:
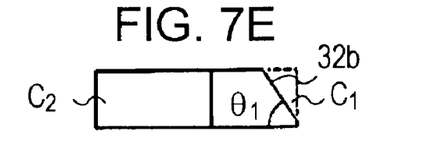
FIG. 7E is a rear view.

For example, as shown in FIG. 7D, the second raising mirror 32 has a shape in which one of lateral surfaces of a plate-like mirror member having the lateral surfaces each being arranged at about 90 degrees to the reflection surface 32a thereof, is processed by chamfering $C_1$.

Figure 8A:
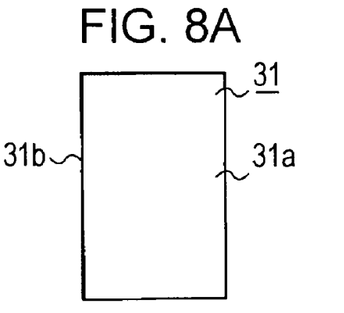
FIG. 8A is a plan view.
Figure 8B:
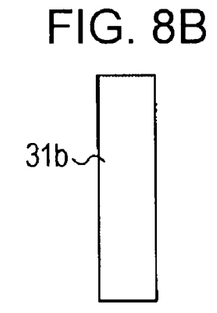
FIG. 8B is a left side view.
Figure 8C:
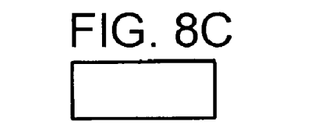

In contrast, referring to FIGS. 8A, 8B, and 8C, the first raising mirror 31 is made of a plate-like mirror member having lateral surfaces each being arranged at about 90 degrees to a reflection surface 31a thereof.

The first and second raising mirrors 31 and 32 are arranged such that the lateral surface 32b arranged at the angle of 90 degrees or smaller to the reflection surface 32a of the second raising mirror 32 faces a lateral surface 31b of the first raising mirror 31. Referring to FIGS. 5 and 6, position-regulating portions 20a, 20b, 20c, and 20d for raising mirrors are formed integrally with the mounting base 20. The first and second raising mirrors 31 and 32 are respectively fixed by the position-regulating portions 20a, 20b, 20c, and 20d in the condition described above.

The first and second raising mirrors 31 and 32 are arranged such that the lateral surface 32b of the second rising mirror 32 is at an angle of 90 degrees or smaller to the reflection surface 32a and the lateral surface 32b faces the lateral surface 31b of the first raising mirror 31, even when the first raising mirror 31 reflects the optical beam from the first direction $D_1$ to cause the optical beam to be incident on the first objective lens 23 and the second raising mirror 32 reflects the optical beam from the second direction $D_2$ to cause the optical beam to be incident on the second objective lens 24. Accordingly, the first and second raising mirrors 31, 32, and the reflection surfaces 31a and 32a can be closely arranged. The optical beams reflected from the first and second raising mirrors 31 and 32 are respectively incident on the first and second objective lenses 23 and 24 in the substantially parallel condition, that is, the optical beams are respectively incident on the first and second objective lenses 23 and 24 which are arranged so that the optical axes thereof are substantially parallel to each other. The first and second objective lenses 23 and 24 can be closely arranged. The lens holder 12 for holding the first and second objective lenses 23 and 24 can be reduced in size, and an actuator (objective lens drive mechanism) can be reduced in size. Thus, the response characteristic can be prevented from degrading due to an increase in size of the actuator.

Also, when the objective lenses 23 and 24 are aligned in the radial direction (tracking direction T) in the optical pickup 1 according to this embodiment, both the objective lenses 23 and 24 have to follow the optical disc to the inner circumference and to the outer circumference thereof. A distance between the objective lenses 23 and 24 is increased, and hence, a moving distance of the lens holder 12 is increased. Also, if the distance between the objective lenses 23 and 24 is too large, the objective lens provided near the inner circumference in the radial direction is no longer available for recording and reproduction when the objective lens faces the inner circumference of the optical disc. In contrast, with the first and second raising mirrors 31 and 32, the distance between the objective lenses 23 and 24 can be reduced, thereby preventing this problem.

Referring to FIGS. 7A, 7C, 7D, and 7E, in the second raising mirror 32, the reflection surface 32a is formed into a shape, in which at least one of third and fourth vertexes 32e and 32f of a substantially rectangular shape of the reflection surface 32a being opposite to first and second vertexes 32c and 32d near the lateral surface 32b is processed by chamfering. An edge formed by chamfering is arranged to be parallel to the plane orthogonal to the optical axis. In particular, in the second raising mirror 32, the third vertex 32e of the rectangular reflection surface 32a is cut by chamfering $C_2$, and an edge 32g formed by chamfering $C_2$ is arranged to be parallel to the plane orthogonal to the optical axis. That is, the second raising mirror 32 is mounted on the mounting base 20 such that the edge 32g serves as a bottom. With this arrangement, the second raising mirror 32 can reduce the arrangement space thereof. Also, the optical pickup 1 can be reduced in size.

Similarly, in the second raising mirror 32, the fourth vertex 32f of the rectangular reflection surface 32a is cut by chamfering $C_3$. With this arrangement, the second raising mirror 32 can reduce the arrangement space thereof. That is, by chamfering a portion at an upper end when the above-mentioned edge 32g serves as the bottom, the size of the objective lens in the arrangement space can be reduced in size in the optical-axis direction. Accordingly, the optical pickup 1 can be reduced in size.

As described above, the second raising mirror 32 serves as one of the pair of raising optical elements that respectively reflect the optical beams in the first and second directions $D_1$ and $D_2$ having the predetermined angle defined therebetween within the plane substantially orthogonal to the optical axes of the plurality of objective lenses 23 and 24 arranged such that the optical axes thereof are parallel to each other, to cause the optical beams to be incident on the plurality of objective lenses 23 and 24. The first raising mirror 31 serving as the other of the raising optical elements may be an inexpensive plate-like mirror with a simple configuration. Also, as for the second raising mirror 32, the plate-like mirror is processed merely by chamfering $C_1$, thereby reducing the distance between the objective lenses 23 and 24. Further, merely by chamfering $C_2$ or $C_3$, the arrangement space can be reduced. Thus, the configuration of the optical pickup can be simplified and the size thereof can be reduced with a simple configuration.

While the first and second raising optical elements of the optical pickup according to this embodiment is formed such that the plate-like mirror is processed by chamfering, it is not limited thereto. The shapes of the first and second raising optical elements may be any shape as long as the optical elements can be closely arranged. Also, the optical elements do not have to be mirrors and may be prisms or the like. It is noted that when the mirror is processed by chamfering as described above, a configuration can be easily and simply made, and is advantageous to the manufacturing process and the cost thereof.

While in the first and second raising optical elements of the optical pickup according to this embodiment, the lateral surface of the second raising mirror 32 is at an angle of 90 degrees or smaller to the reflection surface thereof, it is not limited thereto. The lateral surface of the first raising mirror 31 may be at an angle of 90 degrees or smaller to the reflection surface thereof. Alternatively, the lateral surfaces of the first and second raising mirrors 31 and 32 facing each other may be at certain angles to the reflection surfaces from about 90 degrees, so that the first and second raising mirrors 31 and 32 can be closely arranged.

Meanwhile, a tracking coil 51 and a focusing coil 52 are mounted at the lens holder 12 holding the objective lenses 23 and 24. The tracking coil 51 generates a driving force in the tracking direction T which is substantially a radial direction of the optical disc. The focusing coil 52 generates a driving force in the focusing direction F which is a direction coming close to or away from the optical disc. Also, magnets (not shown) are provided at the mounting base 20, at positions opposite to the tracking coil 51 and the focusing coil 52, and apply predetermined magnetic fields to the tracking coil 51 and the focusing coil 52.

When the tracking coil 51 and the focusing coil 52 are supplied with driving current, the lens holder 12 is driven and shifted in the tracking direction T and the focusing direction F by an interaction between the current supplied to the coils and the magnetic fields applied from the magnets.

Accordingly, the first and second objective lenses 23 and 24 supported by the lens holder 12 are driven and shifted in the focusing direction F and/or the tracking direction T. Hence, focusing control and tracking control are performed. In the focusing control, the optical beams for irradiation of the optical disc through the first and second objective lenses 23 and 24 are controlled so as to be focused on the signal recording surface of the optical disc. In the tracking control, the optical beam is controlled so as to follow a recording track formed on the optical disc. While the tracking coil, the focusing coil, and the magnets that apply the magnetic fields to these coils are described, for example, a tilting coil and a magnet for the tilting coil may be provided for tilting control, in which a lens holder and an objective lens held with the lens holder are inclined in a radial-tilt direction which is a direction around the tangential direction Tz, or in a tangential-tilt direction which is a direction around the tracking direction T.

In the optical pickup 1 with the above-described configuration, the emitting unit provided at the first or second laser source 21 or 22 emits the optical beam with the wavelength corresponding to the type of the optical disc from among the optical beams with the first to third wavelengths, and the focusing control and the tracking control are performed so that the optical beam emitted via the objective lens corresponding to the type of the optical disc from among the first and second objective lenses 23 and 24 is focused on a predetermined recording track and follows the recording track, thereby performing recording or reproduction of information signals on or from the optical disc. The optical pickup 1 includes the plurality of objective lenses 23 and 24 and the plurality of raising mirrors 31 and 32 that cause the optical beams to be incident on the objective lenses 23 and 24. One of the plurality of optical beams with the different wavelengths is selected and emitted on one of the plurality of types of optical discs, thereby recording and/or reproducing information on and/from the optical disc. With this optical pickup 1, the distance between the objective lenses 23 and 24, and the distance between the raising mirrors 31 and 32 can be reduced, thereby reducing the size of the lens holder for holding the objective lenses 23 and 24.

The optical pickup 1 according to the embodiment of the present invention includes the laser sources 21 and 22 that emit the plurality of optical beams with the different wavelengths; the first and second objective lenses 23 and 24 having different specifications and arranged so that the optical axes thereof are substantially parallel to each other; the first raising mirror 31 serving as the first raising optical element that reflects the optical beam from the first direction $D_1$ within the plane substantially orthogonal to the optical axis of the first objective lens 23, to cause the reflected optical beam to be incident on the first objective lens 23; and the second raising mirror 32 serving as the second raising optical element that reflects the optical beam from the second direction $D_2$ at the angle to the first direction $D_1$ within the plane substantially orthogonal to the optical axis of the second objective lens 24, to cause the reflected optical beam to be incident on the second objective lens 24. At least the one lateral surface 32b of at least the second raising mirror 32 from among the first and second raising mirrors 31 and 32 is formed at the angle of 90 degrees or smaller to the reflection surface 32a thereof. The lateral surface 32b is arranged to face the lateral surface 31b of the first raising mirror 31. Accordingly, the reflection surfaces 31a and 32a of the first and second raising mirrors 31 and 32 can be closely arranged, thereby reducing the distance between the first and second objective lenses 23 and 24, and reducing the size of the lens holder 12 for holding the objective lenses 23 and 24.

That is, in the optical pickup 1 according to the embodiment of the present invention, the first and second raising mirrors 31 and 32 that reflect the optical beams from the directions $D_1$ and $D_2$ with the predetermined angle defined therebetween within the predetermined plane (within the plane orthogonal to the optical axes of the objective lenses), to cause the optical beams to be incident on the objective lenses 23 and 24 which are substantially parallel to each other, are formed such that at least the lateral surface 32b from among the facing lateral surfaces of the first and second raising mirrors 31 and 32 is arranged at the predetermined angle to the reflection surface 32a thereof. Accordingly, the first and second raising mirrors 31 and 32, and the reflection surfaces 31a and 32a can be closely arranged, and hence, the objective lenses 23 and 24 can be closely arranged. Thus, the lens holder 12, the objective lens drive mechanism, and the entire optical pickup can be reduced in size. Also, degrading of the response characteristic, and recording/reproduction failure due to an increase in size of the lens holder can be prevented.

Also, the optical disc apparatus 101 according to the embodiment of the present invention includes the drive unit that holds and rotationally drives the optical disc desirably selected from the plurality of types of optical discs; and the optical pickup that records and/or reproduces information by irradiating the optical disc rotationally driven with the drive unit, with the corresponding optical beam selected from the plurality of optical beams with different wavelengths. By applying the above-described optical pickup 1 to the optical disc apparatus, the apparatus can be simplified and reduced in size. The degrading of the response characteristic, the recording/reproduction failure, and the like, can be prevented, and good recording/reproduction characteristic can be provided.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup that records and/or reproduces information by irradiating a plurality of types of optical discs selectively with a plurality of optical beams with different wavelengths, the optical pickup comprising:

a laser source that emits the plurality of optical beams with the different wavelengths;

first and second objective lenses having different specifications and arranged so that optical axes thereof are substantially parallel to each other;

a first raising optical element that reflects an optical beam from a first direction within a plane substantially orthogonal to the optical axis of the first objective lens, to cause the reflected optical beam to be incident on the first objective lens; and a second raising optical element that reflects an optical beam from a second direction at an acute angle to the first direction, the acute angle being formed between the first and second directions on a side of the second raising optical element corresponding to a bending mirror that reflects an optical beam toward the second raising optical element along the second direction, the acute angle being within a plane substantially orthogonal to the optical axis of the second objective lens, to cause the reflected optical beam to be incident on the second objective lens, wherein at least one lateral surface of at least one of the first and second raising optical elements is formed at an angle of 90 degrees or smaller to a reflection surface thereof, and wherein the lateral surface of the one of the first and second raising optical elements is arranged to face a lateral surface of the other of the first and second raising optical elements.

2. The optical pickup according to claim 1, wherein the one of the first and second raising optical elements is formed into a shape in which one of lateral surfaces of a plate-like member having the lateral surfaces each being arranged at about 90 degrees to the reflection surface thereof is processed by chamfering.

3. The optical pickup according to claim 2, wherein the reflection surface of the one of the first and second raising optical elements is formed into a shape in which at least one of third and fourth vertexes of a substantially rectangular member being opposite to first and second vertexes thereof near the processed lateral surface is processed by chamfering, and wherein the one of the first and second raising optical elements is arranged such that an edge defined by chamfering the third or fourth vertex is parallel to the plane orthogonal to the optical axis of the corresponding objective lens.

4. The optical pickup according to claim 1, wherein the first and second raising optical elements are made of plate-like mirrors, or members in which plate-like mirrors are processed by chamfering.

5. The optical pickup according to claim 1, wherein the first and second objective lenses are aligned in a tracking direction.

6. An optical disc apparatus comprising:

a drive unit that holds and rotationally drives an optical disc desirably selected from a plurality of types of optical discs; and an optical pickup that records and/or reproduces information by irradiating the optical disc rotationally driven with the drive unit, with a corresponding optical beam selected from a plurality of optical beams with different wavelengths, the optical pickup including a laser source that emits the plurality of optical beams with the different wavelengths;

first and second objective lenses having different specifications and arranged so that optical axes thereof are substantially parallel to each other;

a first raising optical element that reflects an optical beam from a first direction within a plane substantially orthogonal to the optical axis of the first objective lens, to cause the reflected optical beam to be incident on the first objective lens; and a second raising optical element that reflects an optical beam from a second direction at an acute angle to the first direction, the acute angle being formed between the first and second directions on a side of the second raising optical element corresponding to a bending mirror that reflects an optical beam toward the second raising optical element along the second direction, the acute angle being within a plane substantially orthogonal to the optical axis of the second objective lens, to cause the reflected optical beam to be incident on the second objective lens, wherein at least one lateral surface of at least one of the first and second raising optical elements is formed at an angle of 90 degrees or smaller to a reflection surface thereof, and wherein the lateral surface of the one of the first and second raising optical elements is arranged to face a lateral surface of the other of the first and second raising optical elements.

7. The optical pickup according to claim 1, wherein the one of the first and second raising optical elements is formed into a shape in which a plurality of lateral surfaces arranged at about 90 degrees to the reflection surface thereof are processed by chamfering.

8. The optical pickup according to claim 2, wherein the lateral surfaces of the other one of the first and second raising optical elements are formed at an angle of 90 degrees to a reflection surface thereof.

* * * * *